United States Patent [19]

Hibi

[11] Patent Number: 5,136,903
[45] Date of Patent: Aug. 11, 1992

[54] METHOD OF AUTOMATICALLY DETERMINING A MACHINING RANGE FOR LATHE TURNING MACHINING AND AN AUTOMATIC PROGRAMMING SYSTEM FOR LATHES

[75] Inventor: Akira Hibi, Niwa, Japan

[73] Assignee: Kabushiki Kaisha Okuma Tekkosho, Aichi, Japan

[21] Appl. No.: 611,098

[22] Filed: Nov. 8, 1990

[30] Foreign Application Priority Data

Nov. 17, 1989 [JP] Japan .................................. 1-298872

[51] Int. Cl.[5] ............................................ G06F 15/46
[52] U.S. Cl. ........................................ 82/1.11; 82/118; 364/474.02; 364/474.15; 364/474.22
[58] Field of Search .................................. 82/1.11, 118; 364/474.02, 474.15, 474.25, 474.26, 474.22

[56] References Cited

U.S. PATENT DOCUMENTS 4,633,409 12/1986 Sekikawa .......................... 82/118 X Primary Examiner—Steven C. Bishop
Attorney, Agent, or Firm—Wenderoth, Lind & Ponack

[57] ABSTRACT

In the present invention, a machining range for each chucking can be determined automatically by inputting a final work shape and a starting material shape. Therefore, the burden on the operator can be reduced. That is, the present invention is a method for automatically determining a machining range, comprising the step of inputting a final work shape and a starting material shape for a lathe turning machining operation and automatically collectively determining one or more chucking places and corresponding lathe turning machining ranges which will result in the production the desired final work shape. Further, the present invention is an automatic programming system for controlling lathes, comprising a machining range determination portion that collectively determines one or more chucking places and corresponding lathe turning machining ranges, which will result in the production of the desired final work shape, on the basis of the final work shape and the starting material shape.

22 Claims, 5 Drawing Sheets

METHOD OF AUTOMATICALLY DETERMINING A MACHINING RANGE FOR LATHE TURNING MACHINING AND AN AUTOMATIC PROGRAMMING SYSTEM FOR LATHES

BACKGROUND OF THE INVENTION

1. Field of the Invention

The present invention relates to a method for automatically determining a machining range for lathe turning machining and an automatic programming system for lathes and, in particular, to a method for automatically determining the machining range for a lathe turning machining operation and an automatic programming system for lathes which are effective in changing chucking places two or more times before the final work shape is reached.

2. Description of the Prior Art

In an on-line interactive automatic programming system and an off-line automatic programming system for numerically controlled lathes, a method of automatically determining a machining process, a method of editing at will, and the like, by inputting the shapes of the final work and the starting material have been prepared. Not all machining for common final works can be performed in a single chucking process. Therefore, in almost all cases, a place machined during the first chucking must be chucked next so that the place chucked the first time can be machined.

However, in the conventional machining range determination method described above, a machining range can be determined for only one chucking. Therefore, an operator must separately determine the range of machining for each particular chucking. Accordingly, knowledge of the machining is indispensable to the operator. There also exists a problem in that the input operation is laborious.

SUMMARY OF THE INVENTION

The present invention has been devised in light of the above-mentioned circumstances. An object of the present invention is to provide a method for automatically determining a machine range for a lathe turning machining operation and an automatic programming system for lathes capable of reducing the burden of the operator.

According to one aspect of the present invention, for achieving the objects described above, there is provided a method for automatically determining a machining range, comprising the steps of inputting a final work shape and a starting material shape for a lathe turning machining operation and automatically collectively determining one or more chucking places and a lathe turning machining range for each chucking place, which can be used in obtaining the final work shape.

According to another aspect of the present invention, there is provided an automatic programming system for controlling lathes, comprising a machining range determination means that collectively determines one or more chucking places and a lathe turning machine range for each chucking place, which can be used in obtaining the final work shape, on the basis of said final work shape and the starting material shape.

These and other objects, features and advantages of the present invention will become clear when reference is made to the following description of the preferred embodiments of the present invention, together with reference to the accompanying drawings.

DESCRIPTION OF THE PREFERRED EMBODIMENT

The embodiment of the present invention will be explained hereinafter with reference to the accompanying drawings.

Figure 1:
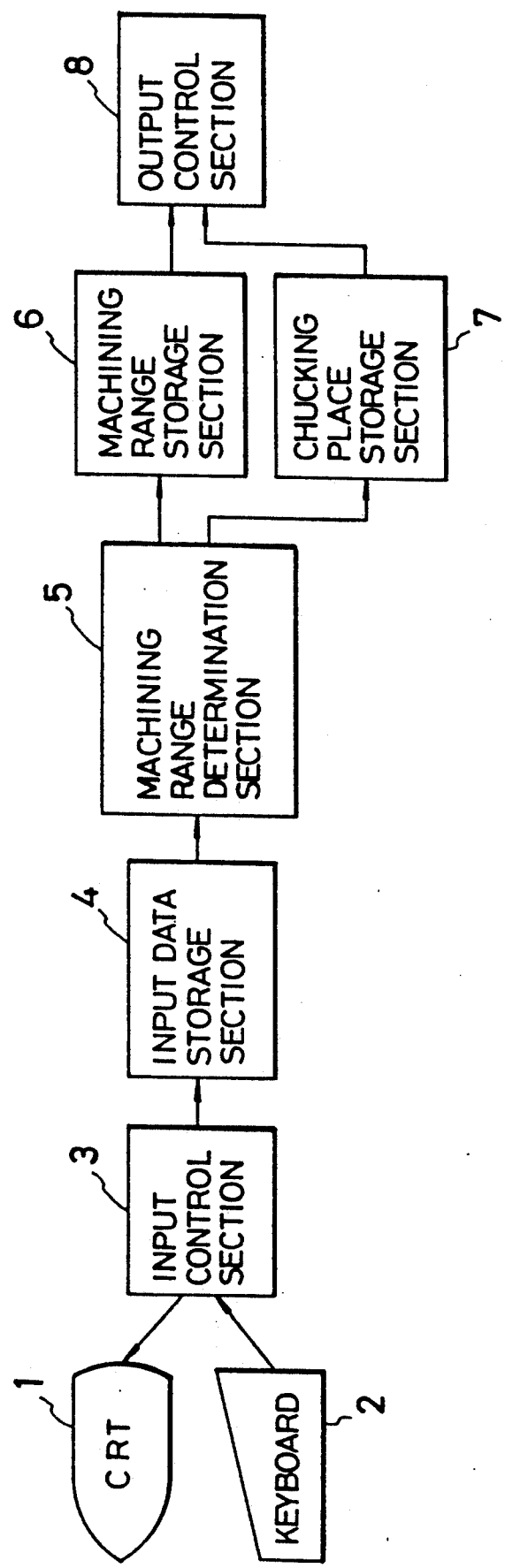
FIG. 1 is a schematic block diagram of an automatic programming system for lathes, according to the present invention.

FIG. 1 is a schematic block diagram of an automatic programming system for lathes of the present invention. In FIG. 1, an input control section 3 allows data to be input via a keyboard 2 to be stored in an input data storage section 4 on the basis of an input guide displayed on a CRT 1. A machining range determination section 5 determines machining ranges and chucking places on the basis of input data stored in the input data storage section 4 and stores the machining ranges and chucking places in a machining range storage section 6 and a chucking place storage section 7, respectively. An output control section 8 outputs and transfers the determined machining ranges and the chucking places to the CRT 1 and to other system sections. The machining range determination section 5 is related to the determination method of the present invention.

Figure 2A:
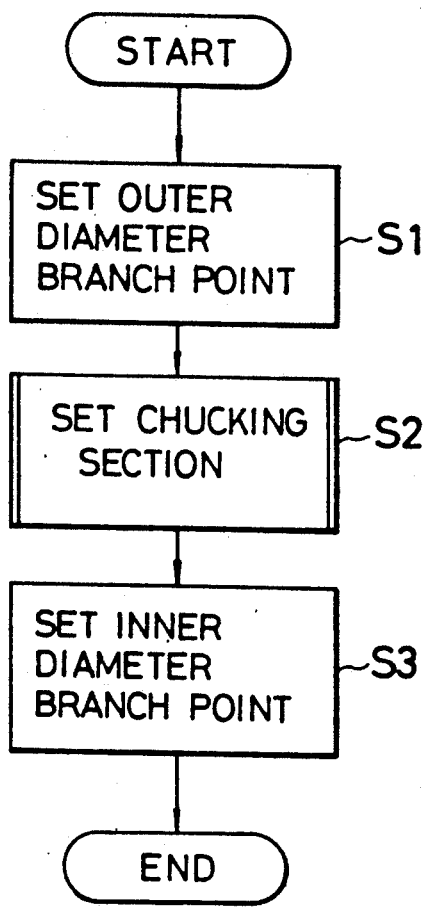
FIGS. 2A to 2C are flow charts illustrating a method for automatically determining a machining range, according to the present invention.
Figure 2B:
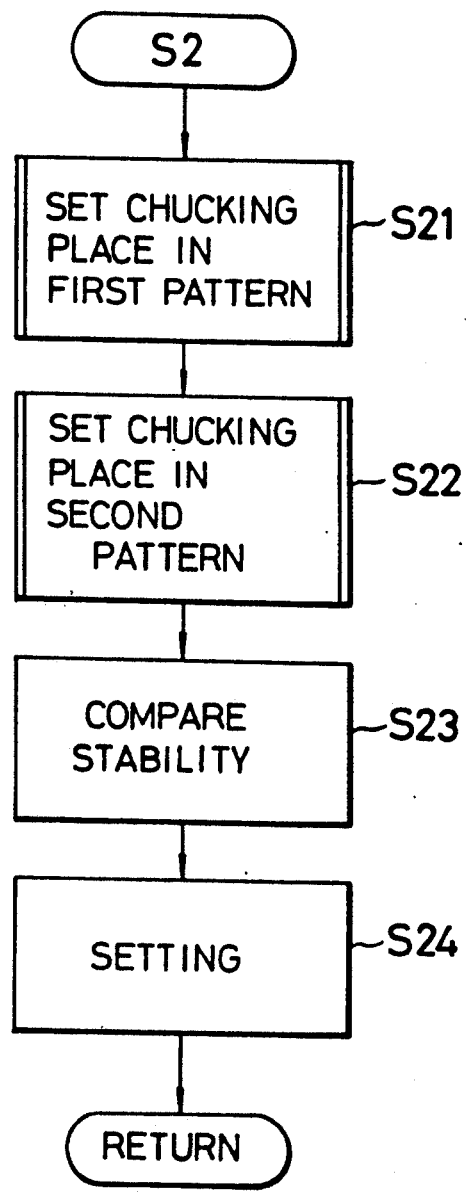
Figure 2C:
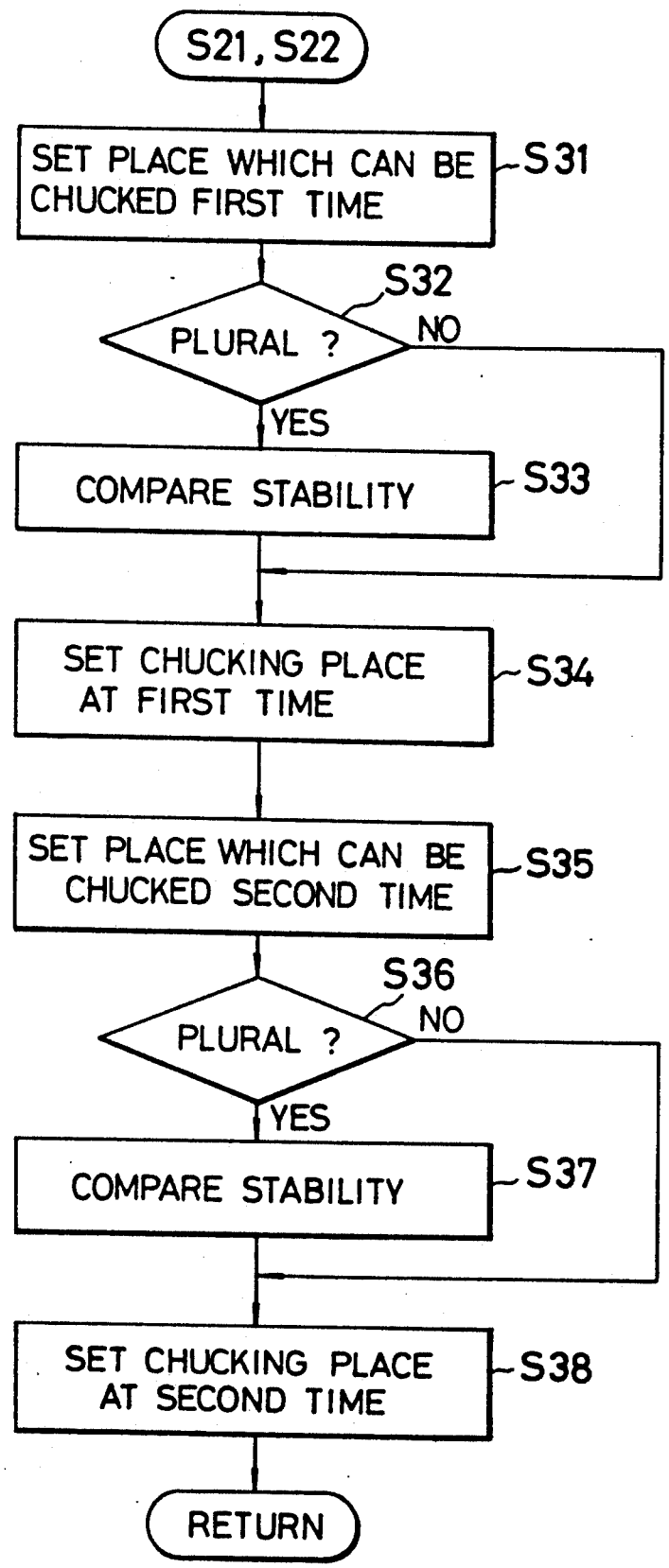
Figure 3A:
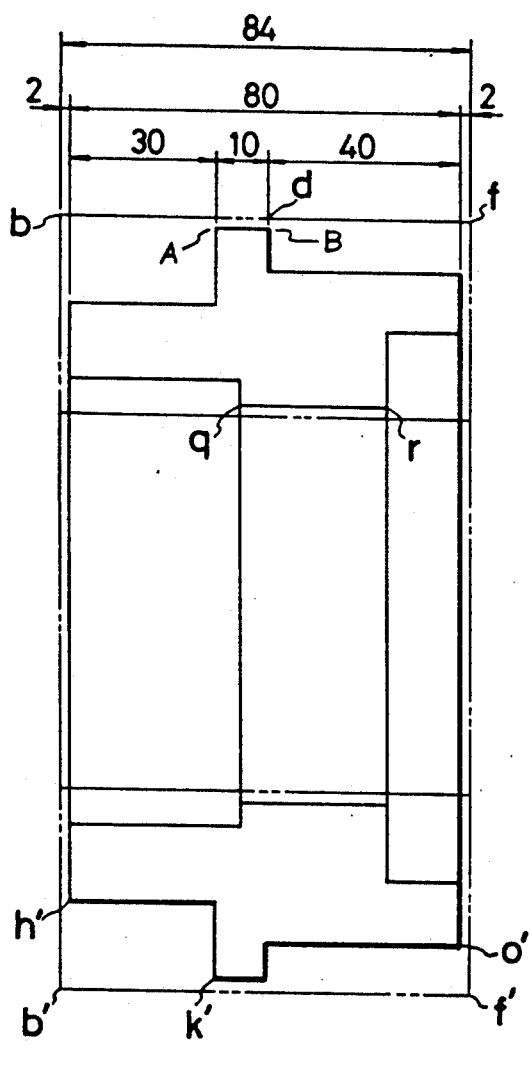
FIG. 3A is a view showing an example of a final work shape and a starting material shape.
Figure 3B:
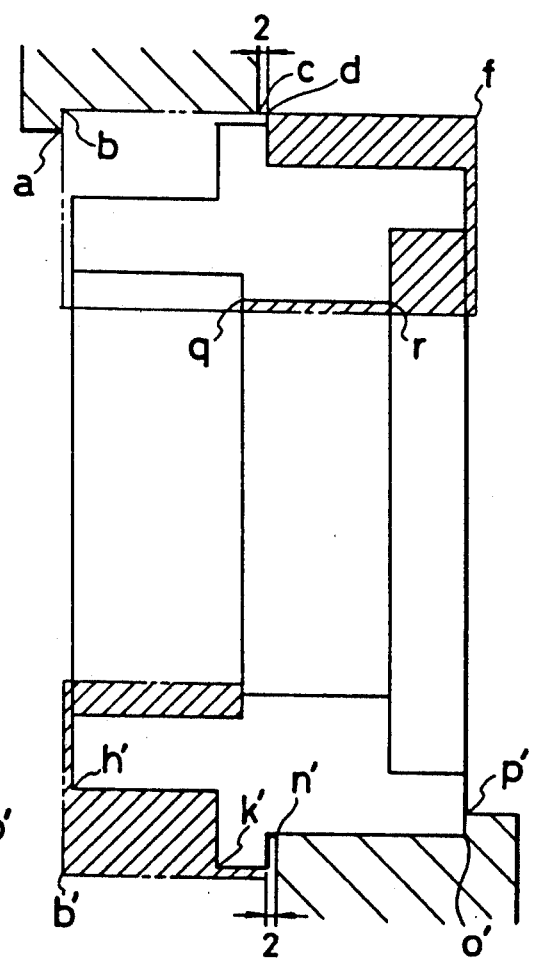
FIGS. 3B and 3C show first and second chucking patterns, respectively, for the example of FIG. 3A.
Figure 3C:
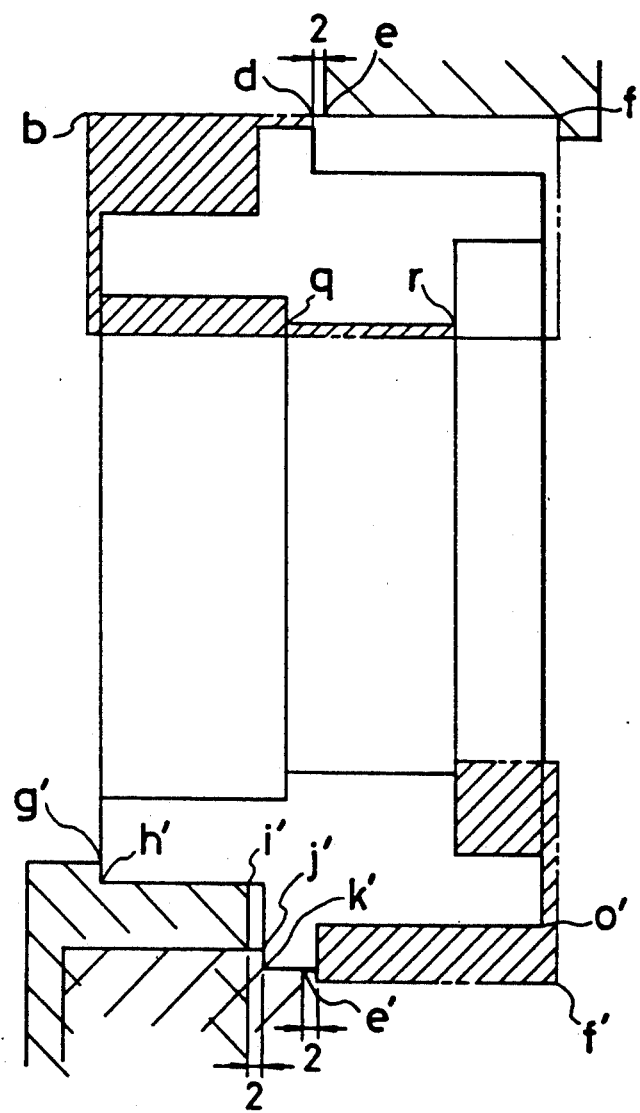

FIGS. 2A to 2C are flow charts illustrating the method for automatically determining the machine ranges, according to the present invention. FIGS. 3A to 3C are views showing an example of a final work shape and a starting material shape, for use in explaining the present invention. The machining range automatic determination method of the present invention will be explained with reference to the examples of FIGS. 3A to 3C.

As shown in the flow chart of FIG. 2A, outermost diameter points are searched for in the final work shape, and, if there are two or more such points, the one of such points which is nearest the center of the work is set as the outer diameter branch point (Step S1). In the illustrated examples of the final work shape and the starting material shapes (the starting material being depicted by the long and two short dashed line segments) shown in FIG. 3A, there are two outermost (or largest) diameter points A and B. Of these, the point B is nearest the center of the work, and thus the point B is set as the outer diameter branch point.

The next step is the setting of the chucking section (Step S2). The detailed procedure thereof is illustrated in FIG. 2B. Initially, chucking places are set for a first pattern (Step S21). Generally, a first chucking place and a second chucking place stand opposite one another. Which side is to be chucked first is determined by the shape of the final work and the shape of the starting material. For example, the first pattern is a case where the left side of the starting material (as shown in FIG. 3A) is chucked first and the right side ff the material is to be chucked second. FIG. 3B shows the set results in the first pattern. The setting procedure for this first pattern will now be explained in detail with reference to FIG. 2C. Possible initial chucking places are set for the first pattern on the condition that there be an outer diameter and a grip (straight outer diameter) section and an abutment section (Step S31). Accordingly, the a-b-c portion is set as an initial (or first) chucking place in the example shown in FIG. 3b. The point c of this initial chucking place is spaced a little away (e.g. 2 mm) from the branch point d of the machining range, since it is impossible to machine right at the chucking place 2. The length of the a-b region, i.e., the abutment distance, is similarly of a fixed length. Data of this fixed clearance length and of the abutment distance are usually stored as internal data, but they can be specified by inputting them. Next, whether there are two or more places which can be initially chucked is checked (Step S32). In the case of the example, there is only one portion (a-b-c) which can be initially chucked in the first pattern. Therefore, no stability comparison (Step S33) need be performed, and the first chucking place is set (Step S34). The next step in setting chucking places for the first pattern is to set a second chucking place (Step S35). In the first pattern of the example, the n'-o'-p' portion is set as the second chucking place. Again, no stability comparison (Step S37) need be performed, since there is only one place which can be used as a second chucking place. Thus, the second chucking place for the first pattern is set (Step 38).

After the setting of the chucking places for the first pattern in the above-described procedure is completed, the chucking places for the second pattern are then set (Step S22). For the second pattern, the starting material is to be initially chucked from an end of the starting material opposite the end initially chucked in the first pattern. FIG. 3C shows the setting results for the second pattern in the example. The setting procedure for the second pattern is the same as that for the first pattern, as illustrated in FIG. 2C. In this second pattern, the initial chucking can again be accomplished at only one place, but a plurality of places can be set for the second chucking. These places are the g'-h'-i' portion and the j'-k'-e' portion in FIG. 3C. As more than one second chucking place is available, the stabilities of the second chucking places are compared in Step S37. In the stability comparison, a stability coefficient is determined from an equation (1). The chucking position with the higher stability coefficient is adopted.

$$\text{Stability coefficient} = \frac{\text{Grip length}}{\text{Axial distance between abutment surface and opposing end surface}} \quad (1)$$

To be specific, the stability coefficient of the g'-h'-i' portion is determined as follows: (distance between points h' and i')/(axial distance between point h' and a point f')=(30−2)/(84−2)=0.34. The stability coefficient of the j'-k'-e' portion is determined as follows: (distance between points k' and e')/(axial distance between point k' and a point f')=(10−2)/(10+40+2)=0.15. Therefore, because the g'-h'-i' portion has a higher stability coefficient than the j'-k'-e' portion, the g'-h'-i' portion is set as the second chucking place. In the above equation, "2" represents the fixed clearance length.

When the chucking places in the first and second patterns are set in the above manner, the stabilities of the first and second patterns are compared with each other (Step S23). In this stability comparison, the pattern that does not include the smallest stability coefficient is adopted, and the pattern is set (Step S24). To be specific, in the same way as the above-described computation method, a stability coefficient is determined from the above equation (1) on the basis of the dimensions described in FIG. 3A, as follows: in the first pattern, the stability coefficient of the first chucking place=(distance between portions b−c)/(axial distance between the point b and the point f)=(30+10+2−2)/84=0.48, and the stability coefficient of the second chucking place=(distance between portions n'−o')/(axial distance between the point o' and the point b')=(40−2)/(84−2)=0.46; and in the second pattern, the stability coefficient of the first chucking place=(distance between points e and f)/(axial distance between the point f and the point b)=(40+2−2)/84=0.48, and the stability coefficient of the second chucking place=(distance between points h' and i')/(axial distance between the point h' and the point f')=(30−2)/(84−2)=0.34. Therefore, because the second pattern includes the chucking place with the lowest stability coefficient, the first pattern is adopted and set.

Lastly, at step S3, an inner diameter branch point is set. In setting this point, the smallest inner diameter point or points are first determined. In the example, both points q and r shown in FIG. 3b qualify as smallest inner diameter points. Because both points q and r qualify, the point nearer to the first chucking point, i.e., the point q, is set as the inner diameter branch point. The smallest inner diameter portion (i.e. the q-r portion) is generally machined in the first chucking.

In the example, if all procedures explained above are performed, as a result, the portion shown by hatching in FIG. 3B is set as a chucking place and its machining range.

As has been explained, according to the inventive method for automatically determining a machining range for a lathe turning machine operation and according to the inventive automatic programming system for lathes, if a finally machined shape of a work and a starting material shape are input, respective machining ranges can be determined for each chucking. Consequently, the operator need not at all consider the chucking places or the machining ranges for each chucking when information is input. As a result, knowledge about machining is unnecessary, and input for machining the entire work can be carried out as a one-time input, thereby reducing the input labor considerably.

Many different embodiments of the present invention can be made without departing from the spirit and scope thereof. Therefore, it is to be understood that this invention is not limited to the specific embodiments thereof except as defined in the appended claims.

I claim:

1. A system for automatically controlling a lathe to perform a lathing operation to machine a workpiece from a starting material shape into a final work shape, comprising:

input control means for receiving starting material shape data and final work shape data; and machining range determination means, operatively coupled to said input means, for determining plural chucking places at which to place a lathe chuck during the lathing operation, and for determining plural machining ranges respectively corresponding to the plural chucking places, on the basis of said starting material shape data and said final work shape data.

2. A system as recited in claim 1, wherein
in determining said plural chucking places and said plural machining ranges, said machining range determination means is operable to determine, on the basis of said starting material shape data and said final work shape data, a chucking pattern utilizing a first chucking place and a second chucking place.

3. A system as recited in claim 2, wherein
in determining said chucking pattern, said machining range determination means is operable to determine a first chucking pattern utilizing a first chucking place and a second chucking place, and a second chucking pattern utilizing a first chucking place and a second chucking place, and is operable to choose one of said first and second chucking patterns on the basis of said starting material shape data and said final work shape data.

4. A system as recited in claim 3, wherein
in choosing one of said first and second chucking patterns, said machining range determination means is operable to determine which of said first and second chucking patterns is more stable on the basis of said starting material shape data nd said final work shape data.

5. A system as recited in claim 4, wherein
in determining which of said first and second chucking patterns is more stable, said machining range determination means is operable to determine, for each of said first and second chucking places of each of said first and second chucking patterns, a grip length for a lathe chuck on the workpiece relative to an axial distance between an abutment surface of the chuck with the workpiece and an end surface of the workpiece at an end of the workpiece opposite the abutment surface, and to determine which of said first and second chucking patterns does not utilize the one of said first and second chucking places of said first and second chucking patterns having the lowest relative grip length for the lathe chuck on the workpiece.

6. A system as recited in claim 1, further comprising
a machining range storage means for storing information corresponding to said plural machining ranges;
a chucking place storing means for storing information corresponding to said plural chucking places; and
an output device for displaying information corresponding to said plural machining ranges and said plural chucking places.

7. A system as recited in claim 6, further comprising
an output control means for transferring said information corresponding to said plural machining ranges and said information corrresponding to said plural chucking places from said machining range storage means and said chucking place storage means, respectively, to said output device.

8. A system as recited in claim 1, further comprising
an input device operatively connected to said input means.

9. A system as recited in claim 8, wherein
said input device comprises a keyboard.

10. A method for automatically controlling a lathe to perform a lathing operation to machine a workpiece from a starting material shape to a final work shape, comprising the steps of:

receiving starting material shape data and final work shape data; and
determining plural chucking places at which to place a lathe chuck during the lathing operation, and plural machining ranges respectively corresponding to the plural chucking places, on the basis of the starting material shape data and the final work shape data.

11. A method as recited in claim 10, further comprising the step of
controlling the lathe on the basis of the determined plural chucking places and the determined plural machining ranges.

12. A method as recited in claim 11, wherein
said step of determining includes determining, on the basis of said starting material shape data and said final work shape data, a chucking pattern utilizing a first chucking place and a second chucking place.

13. A method as recited in claim 12, wherein
in determining said chucking pattern, said step of determining further includes determining a first chucking pattern utilizing a first chucking place and a second chucking place, and a second chucking pattern utilizing a first chucking place and a second chucking place, and choosing one of said first and second chucking patterns on the basis of said starting material shape data and said final work shape data.

14. A method as recited in claim 13, wherein
in choosing one of said first and second chucking patterns, said step of determining further includes determining which of said first and second chucking patterns is more stable on the basis of said starting material shape data nd said final work shape data.

15. A method as recited in claim 14, wherein
in determining which of said first and second chucking patterns is more stable, said step of determining further includes determining, for each of said first and second chucking places of each of said first and second chucking patterns, a grip length for a lathe chuck on the workpiece relative to an axial distance between an abutment surface of the chuck with the workpiece and an end surface of the workpiece at an end of the workpiece opposite the abutment surface, and to determine which of said first and second chucking patterns does not utilize the one of said first and second chucking places of said first and second chucking patterns having the lowest relative grip length for the lathe chuck on the workpiece.

16. A method as recited in claim 10, wherein
said step of determining includes determining, on the basis of said starting material shape data and said final work shape data, a chucking pattern utilizing a first chucking place and a second chucking place.

17. A method as recited in claim 16, wherein
in determining said chucking pattern, said step of determining further includes determining a first chucking pattern utilizing a first chucking place and a second chucking place, and a second chucking pattern utilizing a first chucking place and a second chucking place, and choosing one of said first and second chucking patterns on the basis of said starting material shape data and said final work shape data.

18. A method as recited in claim 17, wherein in choosing one of said first and second chucking patterns, said step of determining further includes determining which of said first and second chucking patterns is more stable on the basis of said starting material shape data and said final work shape data.

19. A method as recited in claim 18, wherein
in determining which of said first and second chucking patterns is more stable, said step of determining further includes determining, for each of said first and second chucking places of each of said first and second chucking patterns, a grip length for a lathe chuck on the workpiece relative to an axial distance between an abutment surface of the chuck with the workpiece and an end surface of the workpiece at an end of the workpiece opposite the abutment surface, and to determine which of said first and second chucking patterns does not utilize the one of said first and second chucking places of said first and second chucking patterns having the lowest relative grip length for the lathe chuck on the workpiece.

20. A method as recited in claim 10, further comprising the steps of:
storing information corresponding to said plural machining ranges in a machining range storage means;
storing information corresponding to said plural chucking places in a chucking place storage means; and
displaying information corresponding to said plural machining ranges and said plural chucking places on an output device.

21. A method as recited in claim 20, further comprising the step of:
transferring the information corresponding to the plural machining ranges and the information corresponding to the plural chucking places from the machining range storage means and the chucking place storage means, respectively, to the output device.

22. A method as recited in claim 10, wherein
said step of receiving starting material shape data and final work shape data comprises inputting the starting material shape data and the final work shape data by operating a keyboard.

* * * * *